(12) United States Patent
Goins et al.

(10) Patent No.: US 6,382,326 B1
(45) Date of Patent: May 7, 2002

(54) IMPLEMENT SUSPENSION WITH ACCUMULATOR

(75) Inventors: Garrett Lee Goins, Ankeny; Richard Wayne Hook, West Des Moines, both of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/812,649

(22) Filed: Mar. 20, 2001

(51) Int. Cl.$^7$ ............................................. A01B 63/114
(52) U.S. Cl. ...................................................... 172/239
(58) Field of Search ............................. 172/2, 4, 4.5, 7, 172/9, 10, 239; 37/348, 382, 414; 91/361, 459, 461, 527–534; 701/50; 111/134, 200, 903

(56) References Cited

U.S. PATENT DOCUMENTS

| | | | |
|---|---|---|---|
| 3,323,810 A | 6/1967 | Klein ............................. 280/6 |
| 4,174,854 A | 11/1979 | Spicka et al. ................ 280/702 |
| 4,512,589 A | 4/1985 | Ambrose et al. ........... 280/6 R |
| 4,648,446 A | * 3/1987 | Baker et al. .............. 172/260.5 |
| 4,923,014 A | 5/1990 | Mijnders ........................ 172/2 |
| 5,234,060 A | * 8/1993 | Carter ......................... 172/413 |
| 5,520,499 A | 5/1996 | Ufheil et al. ................ 414/685 |
| 5,957,218 A | 9/1999 | Noonan et al. .............. 172/239 |
| 6,129,157 A | 10/2000 | Noonan et al. .............. 172/239 |
| 6,216,794 B1 | * 4/2001 | Buchl ............................. 172/4 |

OTHER PUBLICATIONS

Deere & Company, Agricultural Marketing Information No. 98–6–10, one page, dated May 29, 1998, published in U.S.A.

* cited by examiner

Primary Examiner—Robert E. Pezzuto

(57) ABSTRACT

An implement frame supported by hydraulically controlled lift wheels includes accumulator structure which is selectively connectable by valve structure to the lift cylinder circuit to control flow between the cylinder and accumulator according to implement status. For transport, the valve structure is opened for absorption of shock loads as the lift wheels move over obstructions and surface irregularities. For working in the field, the valve structure is closed to provide stable lift and precise depth control functions. The valve structure can be operated manually or automatically in response to vertical frame movement. In one embodiment, proportional valves are connected to an implement control unit for active suspension control which varies with changing transport conditions. A similar accumulator structure is provided for the hitch weight transfer system.

25 Claims, 2 Drawing Sheets

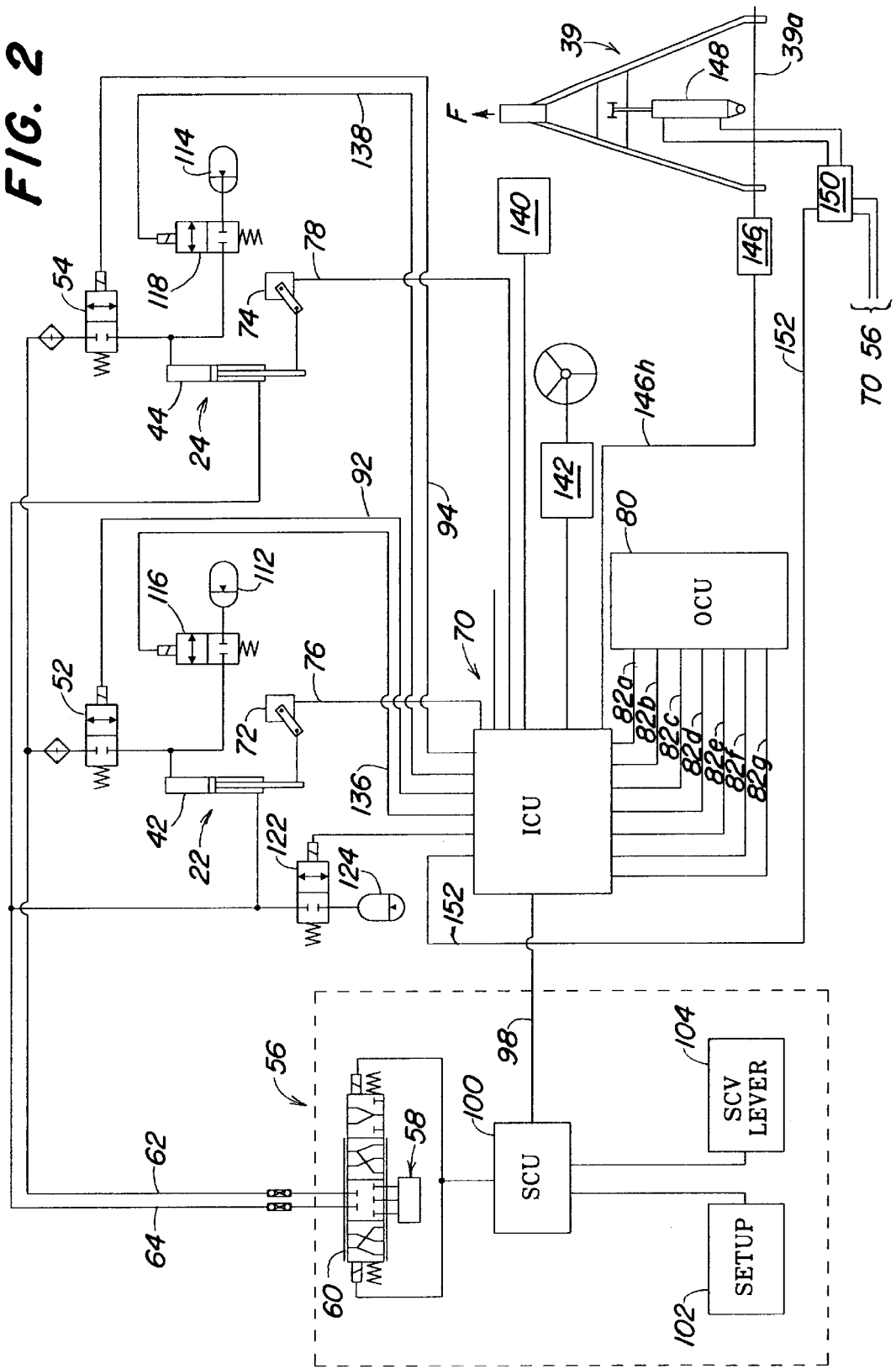

IMPLEMENT SUSPENSION WITH ACCUMULATOR

BACKGROUND OF THE INVENTION

1. Field of the Invention

The present invention relates to agricultural implements such as tillage and seeding implements, and more specifically to lift controls and suspensions for such implements.

2. Description of the Related Art

Multi-sectioned implements typically include a main frame and two or more wing frames hinged to the main frame and movable from a laterally extending position into a narrowed transport position generally over the main frame. The implement includes lift cylinders which raise and lower ground wheels to adjust tool depth during operation in the field, and which raise and lower the implement between working and transport positions. During transport, the cylinders on the main frame usually are locked so the main frame is maintained in a fully raised position. As a result, there is no shock cushioning of the implement during transport. When a large bump or obstacle is encountered by the wheels, a heavy shock load is transferred to the implement particularly when the main frame wheels support the weight of the entire implement. Such shock loads can result in substantial wear and tear on the implement and the towing vehicle. The implement frame, frame supports and hinge structures have to be extremely strong and heavy to bear such loads. When folded to the transport position, the implement has a relatively high center of gravity which sometimes results in unwanted oscillations during towing over irregular field and road surfaces.

A towed agricultural implement is often controlled by an implement control unit (ICU) on the towing vehicle for achieving desired depth control in the field working position, level and attitude control, and lift control across the width and length of the implement. Examples of such control are shown in U.S. Pat. Nos. 5,957,218 and 6,129,157 assigned to Deere & Company. Adding a shock absorbing suspension can be expensive and can significantly deteriorate depth, level, stability and attitude control characteristics of an implement in the field working position and while being raised and lowered between field working and transport positions. Therefore a relatively fixed support system is desirable during field working operations and while the implement is transition between the field working and transport positions.

SUMMARY OF THE INVENTION

It is therefore an object of the invention to provide an improved transport system for a towed implement such as a field cultivator, chisel plow, air seeder or the like. It is another object to provide such a transport system which overcomes most or all of the aforementioned problems. It is yet a further object to provide an economical means for providing improved machine suspension during road or field transport without sacrificing precise depth control during field operations.

It is another object to provide an improved transport system for a towed implement which reduces shock loads during transport and which is particularly useful in combination with electronic controls providing lift, level, depth and attitude control. It is another object to provide such a system which provides better implement transport characteristics and yet maintains depth control and implement attitude and level control when the implement is in the ground working position. It is a further object to provide such a system which provides for stable and level lift and lower functions of the implement.

It is a further object of the present invention to provide an improved transport system for multi-sectioned implements having hinged wing frames which fold relative to a main center frame for transport. It is another object to provide such a system which reduces shock loads on the hinges and other frame components in the transport position and yet does not deteriorate depth control characteristics when the implement is working in the field. It is a further object to provide such a system which is relatively inexpensive and which is particularly useful with implements having automatic depth control.

It is another object of the present invention to provide an improved suspension system for a large towed agricultural implement. It is a further object to provide such a system with active suspension control to improve stability during transport and reduce wear and strain on implement components. It is a further object to provide such a system which does not adversely affect implement depth control in the field.

An implement frame supported by hydraulically controlled lift wheels includes an accumulator which is selectively connectable to the lift wheel hydraulic circuit. A mechanical shutoff valve or electrohydraulic control valve is connected between the lift cylinder and the accumulator to control hydraulic fluid flow between the cylinder and accumulator depending on the status of the machine. During machine transport, the valve is opened to allow the accumulator to absorb shock loads as the lift wheels move over obstructions and surface irregularities. The valve is closed when the implement is lowered from the transport position to provide precise depth control functions. The accumulator provides an economical shock absorbing suspension which is activated when the implement is raised and travelling across the field or on the road.

Valve operation can be controlled manually, mechanically by a linkage between the lift system and the valve, or remotely from the towing vehicle by a switch or implement control unit. Preferably, the accumulator is blocked until the implement is in or closely approaching the fully raised position to that stable lift and leveling functions are provided during raising and lowering of the implement between the field working and transport positions.

In one embodiment, the valve between the accumulator and the lift cylinder is a proportional valve electronically controlled from the towing vehicle. Control can be adjusted automatically or manually in response to implement conditions such as implement weight or wing frame position, or to field or road conditions or the like to change the shock isolating characteristics of the accumulator. For example, if the center section of an implement includes a hopper which is relatively full, the proportional valve is operated at a partially closed position to provide a stiffer suspension to better accommodate the added weight. If the frame section is relatively light, the valve may be fully opened to provide a softer suspension.

In a further embodiment of the invention, the proportional valve may also be used to provide active control of the accumulator and/or cylinder in response to rate of change of a position signal from the position transducer or an accelerometer or similar device on the implement, or from a steering transducer on the towing vehicle. The active suspension can increase transport stability, provide better stability during turns, reduce unwanted oscillations, adjust quickly to changing transport conditions, and lessen shock loads and oscillations under extreme road or field transport conditions. A similar hydraulic arrangement including an accumulator can be provided for a weight transfer system on the towing hitch and controlled from the ICU for added convenience and stability. In addition to providing the normal weight transfer functions, a hydraulic weight transfer cylinder can be controlled to reduce or eliminate towed implement oscillations about axes generally perpendicular to the forward direction, combat tractor hop, and provide adjustable hitch cushioning for differing towing conditions.

Other features and advantages of the present invention will become apparent from the following description taken in view of the drawings.

BRIEF DESCRIPTION OF THE DRAWINGS

FIG. 2 is a schematic representation of the hydraulic circuit including accumulators for controlling the lift of the main section of FIG. 1.

DESCRIPTION OF THE PREFERRED EMBODIMENT

Figure 1:
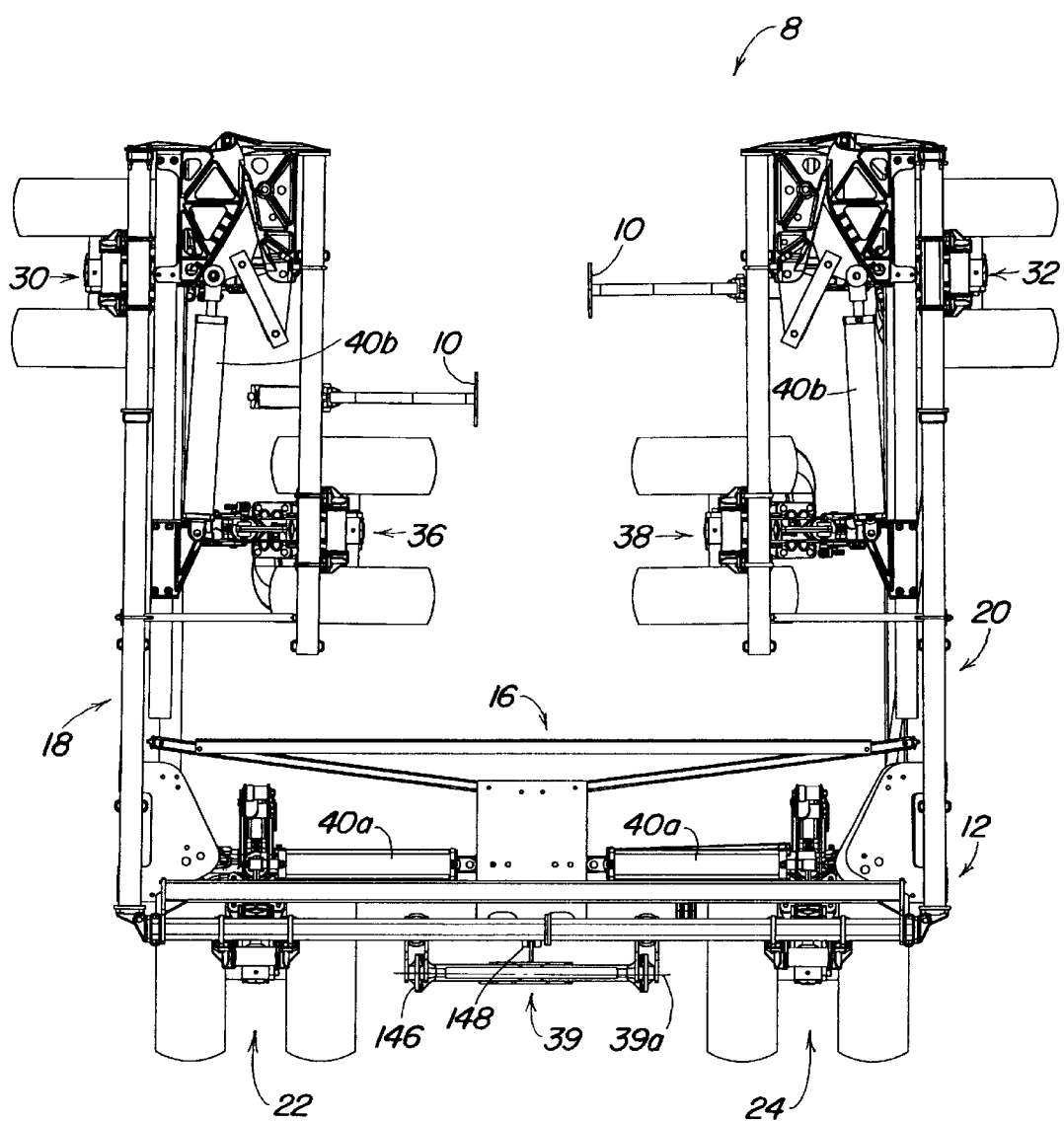
FIG. 1 is a rear view of a multi-section implement frame shown in the folded transport position and having a center main frame section supported on hydraulically operated lift wheel assemblies.

Referring now to FIG. 1, therein is shown generally at 8 an implement with earthworking tools 10 supported from a transversely extending frame 12. The frame 12 includes a center frame or section 16 and inner wing sections 18 and 20 pivotally connected to the center section 16 for pivoting relative to the center section about fore-and-aft extending axes. First and second center frame lift assemblies 22 and 24 are connected at inboard ends to the section 16. Outer wing sections 26 and 28 are hinged to the outboard ends of the inner wing sections 18 and 20, respectively. The inner wing sections 18 and 20 include wing lift assemblies 30 and 32, and the outer wing sections 26 and 28 include lift wheel assemblies 36 and 38. Hitch structure 39 with a weight transfer system is supported from the forward portion of the frame section 16 for pivoting relative to the section 16 about a transverse axis 39a. The forward end of the hitch structure 39 is adapted for connection to a tractor or the like for towing the implement 10 forwardly (F) over a field. Wing fold cylinders 40a and 40b pivot the wing frames between folded transport positions generally over the center frame 16 (shown) and an unfolded, laterally extending field working position.

Individual electrohydraulically controlled cylinders 42 and 44 (FIG. 2) are spaced on the frame section 16 and connected to the lift wheel assemblies 22 and 24. The wing lift wheel assemblies 30, 32 and 36, 38 have similarly controlled hydraulic cylinders which are not shown in FIG. 2 so that the accumulator suspension for the center frame section 16 can be seen more clearly. Reference may be had to the aforementioned U.S. Pat. Nos. 5,957,218 and 6,129,157 if further details of the lift system are desired.

The cylinders 42 and 44 are controlled by individual electrohydraulic control valves 52 and 54 which are shown as two position, two way proportional valves connected between the base ends of the cylinders and hydraulic control structure 56 which may be integral with the tractor, such as exemplified on the commercially available John Deere 8000 and 9000 series tractors. A source of hydraulic fluid under pressure on the tractor, indicated generally at 58, is connected via selective control valve (SCV) 60 to hydraulic lines 62 and 64. The line 62 is connected through the valves 52 and 54 to the base ends of the lift cylinders 42 and 44. The line 64 is connected directly to the rod end of the cylinders 42 and 44.

An implement control unit (ICU) 70 is connected to feedback potentiometers 72 and 74 or other position transducer devices which provide signals via lines 76 and 78 corresponding to extension or frame suspension position. An operator control unit (OCU) 80 is connected through control lines 82a–82g to the ICU 70. The OCU 80 has standard operator adjusted inputs and provides, for example, the following outputs (which are indicated as lines 82a through 82g on FIG. 2), the indicated lines dependent on the adjusted inputs:

82(a) Intermediate depth control voltage signal;
82(b) Depth voltage signal;
82(c) Left wing depth offset;
82(d) Right wing depth offset;
82(e) Main frame level;
82(f) Offset disable; and
82(g) Power source.

These outputs are given by way of example only, and additional outputs may be provided, for example, to control the offset of the outer wings relative to the inner wings.

Outputs 92 and 94 from the ICU 70 are connected to the valves 52 and 54 to move the proportional valves to provide the desired cylinder function and cylinder extension and retraction speeds. The ICU 70 compares the voltages on the lines 72 and 74 for each of the lift assemblies 22 and 24 with a desired signal voltage for that lift assembly. The ICU 70 also compares the signal voltage for each lift assembly with the signal voltages of the other lift assemblies on the implement 8 to raise and lower the entire frame 12 evenly and to provide any desired leveling and tilt functions.

The OCU 80 includes a level reference control, a zero reference control, and a depth control and intermediate depth control to establish the working depth in the field-working positions. Wing offset controls facilitate adjustment of the sections relative to the center frame section 16. A mainframe level control adjusts the height of the left side of the center frame relative to the right side of the frame 16. An enable/disable switch facilitates resetting of the positions. The OCU 80 includes a digital readout of the selected working depth. The depth controls may include variable resistors with rotatable knobs having detents for various operating conditions and for convenient return to a preselected level setting after the offset control feature has been utilized.

The ICU 70 reads the analog inputs from the transducers 72 and 74 for control of the individual lift cylinders 42 and 44. Also, a valve control signal is provided via line 98 from the ICU to a selective control unit (SCU) 100 in the hydraulic control structure 56. The SCU 100 receives input from the ICU 70, conventional setup controls 102 and a standard SCV lever 104 located in the tractor cab to control the SCV 60 in accordance with the desired cylinder operation.

To raise the frame section 16, the SCV 60 is moved from the blocking position shown in FIG. 2 to the position wherein the line 62 is pressurized and the line 64 is returned to sump. The ICU 70 provides signals to the lines 92 and 94 to move the valves 52 and 54 to open positions to extend the cylinders 42 and 44. The rate of extension of each of the lift cylinders may also be controlled to assure level lift. When the frame reaches the raised position, the valves are moved to the blocking positions to maintain the cylinders in the extended positions. To lower the frame, the valves 52 and 54 are moved to the open positions and the pressure in the line 62 is relieved by returning the line to sump through the SCV 60 (or by positioning the SCV 60 in the float position) so that the cylinders retract. When the ICU 70 detects the desired level signal on each of the lines 76 and 78, the corresponding valve 52 or 54 is moved to the blocking position to prevent further retraction. Reference may be had to the aforementioned U.S. Pat. Nos. 5,957,218 and 6,129,157 if further details of the lift and control systems and systems operations are desired. It is to be understood that the above implement lift system is given by way of example only, and that the accumulator suspension described below can be utilized with other types of implement hydraulic lift systems.

To provide shock absorption and cushion the implement 8 during transport, accumulators 112 and 114 are connected via two position, two way shutoff valves 116 and 118 to the base ends of the cylinders 42 and 44. The rod ends of the cylinders 42 and 44, which are connected together and to the line 64, are also connected through a similar valve 122 to an accumulator 124. The two position, two way shutoff valves 122, 116 and 118 have control inputs connected to the ICU 70 by lines 132, 136 and 138, respectively. The cylinders 42 and 44 of the lift assemblies 22 and 24 are extended by pressurizing the line 62 and moving the valves 52 and 54 to lift the center frame section 16 to the fully raised transport position. When the signals on the lines 76 and 78 indicate to the ICU 70 that the cylinders 42 and 44 are in their extended position corresponding to the transport position of the implement, the ICU provides the outputs on lines 92 and 94 to move the valves 52 and 54 to their blocking positions (shown) and the SCV 60 is returned to its blocking position (shown). The ICU 70 monitors cylinder extension and provides signals on the lines 132, 136 and 138 to move the valves 122, 116 and 118 from their blocking positions into their open positions as the cylinders 42 and 44 move into the extended transport position. The accumulator 124 is therefore open to the rod ends of the lift cylinders 42 and 44, and the accumulators 112 and 114 are open to the base ends of the cylinders 42 and 44, respectively, to provide cushioning when implement 8 is in the transport mode. With the accumulators opened to the lift cylinder hydraulic circuit, the cylinder rods are no longer rigidly held in one position but can move in and out to cushion the implement on irregular surfaces during transport in the field or on the road.

While the implement is operating in the transport mode, if an obstacle is encountered by the lift wheel assemblies 22 and 24, the force tending to lift the wheels of the assemblies relative to the frame section 16 will cause the cylinders 42 and 44 to retract as fluid moves under pressure through the open valves 116 and 118 and into the accumulators 112 and 114, respectively. At the same time, the accumulator 124 facilitates the replenishing of the rod ends of the cylinders 42 and 44 through the open valve 122. The opposite action occurs when the cylinders 42 and 44 rebound and return towards the fully extended position as rod end pressure forces fluid back into the accumulator 124 and base end fluid is restored under the influence of the accumulators 112 and 114. When the implement is returned to the field operating mode from the transport mode, the ICU 70 returns the valves 122, 116 and 114 to the closed positions to remove the effects of the accumulators 124, 112 and 114 from the lift cylinder circuit so that precise depth control and stable lift and level functions can be provided.

For more suspension control, the on-off type valves 122, 116 and 114 may be replaced with two position, two way proportional valves controlled by the ICU 70 to provide active control of the damping when the accumulators are opened to the lift cylinder circuit for implement cushioning. For example, if the operator desires stiff suspension characteristics when travelling on very rough surfaces or when the frame section 16 is supporting a relatively heavy load, more restricted open positions can be selected for the valves. On the other hand, if the travelling surface is smooth or the frame section 16 is loaded relatively lightly, a fully open position may be desired for softer suspension characteristics. The ICU can also determine the rate of extension and retraction of the cylinders 42 and 44 in the transport mode by detecting the rate of change of the voltage signals on the lines 76 and 78 and automatically adjust the proportional valves in accordance with the signals. For example, if a sudden acceleration is detected at a cylinder (i.e., a sudden change in the voltage from the corresponding feedback potentiometer 72 or 74) or if the cylinder rods are moving beyond a normal cushioning range, the ICU 70 can immediately move the corresponding valves to a more restricted position to stiffen the suspension. If the signals from the potentiometers 72 and 74 indicate there is relatively little movement of the cylinder rods during transport, the ICU 70 can open the valves to provide a softer suspension.

Other signals from additional transducers on the implement 8 or towing vehicle may be provided to the ICU 70 for more sophisticated active and adaptive suspension control. For example, signals from one or more accelerometers and/or level indicators 140 on the implement 8 are processed by the ICU 70 to determine the desired suspension characteristics for the encountered conditions, and then the ICU provides corresponding signals to the valves to provide those characteristics. In a sophisticated active suspension mode, the ICU 70 enables activation of the valve structure 56 and the valves 52 and 54 as well as the accumulator valves 122, 116 and 118 to control suspension system pressure, accumulator pre-loading, and accumulator damping as well as other variables in the hydraulic system. The system provides limited differential cylinder extension or retraction for added stability, for example, in turns, to compensate for forces which cause the implement to lean outwardly. The signals from the potentiometers 72 and 74 and accelerometers 140 enable the ICU 70 to detect unwanted implement oscillations and control the valves as necessary to actively tune the suspension and/or move the cylinder rods to reduce or eliminate the oscillations. A tractor steering transducer 142 is connected to an input of the ICU 70 to provide a turn signal indication in advance of the potentiometer or accelerometer signals for faster system response to control the suspension when a turn of the implement in the transport mode is initiated.

A hitch angle transducer 146 may also be provided to input hitch position signals to the ICU 70 via line 146h to determine hitch angle and hitch motion. An ICU-controlled hitch cylinder 148 is connected between the frame section 16 and the hitch 39 to control weight transfer between the hitch and the towing vehicle. The cylinder 148 can also be connected to a hydraulic control circuit 150 with accumulator system and controlled from the ICU 70 via lines 152 in a manner similar to that described above for the cylinders 42 and 44 to reduce or eliminate unwanted implement motion oscillations and provide relatively rigid or adjustably cushioned hitch action. For example, if the ICU 70 detects that there are implement oscillations generally about an axis transverse to the forward direction of travel, the cylinder 148 can be controlled to combat such oscillations. Fluid flow between the accumulators and the cylinder 148 can also be closed or adjustably restricted to combat the unwanted motion.

Although the valves 122, 116 and 114 are shown in FIG. 2 as electrohydraulic valves controlled by the ICU 70, the valves may also be manually controlled on-off valves for a simple, low cost system. Before transporting the implement 8, the operator raises the implement to the transport position, and the valves 52, 54 and 56 move to the blocking positions shown in FIG. 2. The operator then manually opens the valves 122, 116 and 118 to provide cushion suspension. The valves 122, 116 and 118 may be partially opened to provide a stiffer suspension or fully opened for a softer suspension. Also, the valve 122, 116 and 118 can be actuated mechanically by a linkage connected between the lift system and the valve actuators so that as the implement reaches the fully raised position, the valves will open to allow hydraulic fluid communication between the accumulators and the cylinders. The mechanical linkage system also can provide variable control by increasing the resistance to flow between the cylinder and the accumulator as the cylinder moves farther from an average steady state transport position.

In folding implement systems where an automatic tool or wheel tuck feature is provided for moving hardware to a non-interfering position when the frame is folded for transport, accumulator valve control can be tied to the tuck feature structure. The accumulator valves are opened with activation of the tuck feature.

Having described the preferred embodiment, it will become apparent that various modifications can be made without departing from the scope of the invention as defined in the accompanying claims.

We claim:

1. In an agricultural implement having a frame adapted for towing by a vehicle, tools connected to the frame, a lift wheel assembly supporting the implement for movement over the ground, the lift wheel assembly including an extensible and retractable hydraulic cylinder, hydraulic control structure connected to a source of hydraulic fluid under pressure and to the cylinder for selectively raising and lowering the frame between transport and field working positions and for adjusting the tools relative to the ground when the frame is in the field working position, suspension structure for cushioning the implement in the transport position comprising:

an accumulator; and control valve structure connected between the accumulator and the cylinder, wherein the control valve structure is movable between a closed position preventing fluid communication between the cylinder and the accumulator to facilitate accurate tool adjustment with the hydraulic control structure when the frame is in the field working position, and an open position providing fluid communication between the cylinder and the accumulator to facilitate cushioned implement support when the implement is in the transport position.

2. The suspension structure as set forth in claim 1 wherein the control valve structure comprises an electrohydraulic valve, and further comprising a controller connected to the electrohydraulic valve and responsive to movement of the implement to the transport position for moving the valve to the open transport position.

3. The suspension structure as set forth in claim 1 including an electronic implement control unit (ICU) operably connected to the hydraulic control structure and to the control valve structure.

4. The suspension structure as set forth in claim 1 including a position transducer providing an implement height signal, a valve controller connected to the control valve structure and responsive to the implement height signal for moving the control valve structure to the open position in response to raising of the frame to the transport position.

5. The suspension structure as set forth in claim 1 including a position transducer providing an implement height signal, a valve controller connected to the control valve structure and responsive to the implement height signal for moving the control valve structure to the closed position in response to lowering of the frame to the transport position.

6. The suspension structure as set forth in claim 1 wherein the control valve structure comprises an adjustable valve for selectively varying resistance to fluid flow between the accumulator and the cylinder to thereby change characteristics of the suspension structure.

7. The suspension structure as set forth in claim 6 wherein the adjustable valve comprises an electrically controlled proportional valve.

8. The suspension structure as set forth in claim 6 including an electronic controller connected to the adjustable valve, a transducer connected to the electronic controller and providing a position signal in response to extension and retraction of the cylinder, the electronic controller responsive to the position signal for controlling the adjustable valve to change the resistance to fluid flow and thereby adjust the suspension in dependence on cylinder extension and retraction.

9. The suspension structure as set forth in claim 1 including a transducer providing an indication of extension and retraction of the cylinder to provide an implement height signal and a valve controller connected to the control valve structure and responsive to the implement height signal for moving the control valve structure to the closed position in response to lowering of the frame to the transport position.

10. The suspension structure as set forth in claim 1 further including a towing hitch movable vertically relative to the frame, a hitch cylinder connected to between the frame and the towing hitch biasing the hitch vertically to provide an adjustable weight transfer between the implement and towing vehicle, and a hydraulic control connected to the hitch cylinder for controlling the hitch cylinder in response to towing conditions encountered by the implement while in the transport position.

11. The suspension structure as set forth in claim 10 wherein the hydraulic control includes an accumulator and a valve selectively communicating fluid flow between the valve and the hitch cylinder to provide adjustable cushioning of the hitch.

12. The suspension structure as set forth in claim 10 including an implement control unit connected to the hydraulic control and providing active bias control when the implement is in the transport position.

13. In an agricultural implement having a frame, a lift wheel assembly including ground engaging wheels supporting the implement for towing forwardly over the ground by a tractor, the lift wheel assembly including an extensible and retractable hydraulic cylinder, hydraulic control structure connected to a source of hydraulic fluid under pressure and to the cylinder for selectively raising and lowering the frame between transport and field working positions and for adjusting the height of the frame relative to the ground when the frame is in the field working position, an active suspension structure for stabilizing the implement in the transport position comprising:

a transducer located on the implement and providing a signal indicative of unwanted motion of the implement while being towed forwardly in the transport position; and an implement control unit connected to the hydraulic control structure and to the transducer and responsive to the signal to control the cylinder to reduce the unwanted motion.

14. The active suspension structure as set forth in claim 13 including hydraulically controlled weight transferring hitch structure connected to the frame and to the implement control unit, the implement control unit varying weight transferring characteristics of the hitch structure in dependence on the signal.

15. The active suspension structure as set forth in claim 13 including an accumulator selectively connectable to the hydraulic cylinder to provide cushion support of the frame while in the transport position.

16. The active suspension structure as set forth in claim 15 wherein the accumulator is connected to the cylinder through an accumulator control valve, and the control valve is responsive to movement of the frame to the transport position to provide the cushion support.

17. The active suspension structure as set forth in claim 16 wherein the control valve is responsive to movement of the frame downwardly from the transport position to block flow between the accumulator and the cylinder when the frame is in the field working position so that accurate frame height control can be provided through the cylinder.

18. The active suspension structure as set forth in claim 15 wherein the cylinder includes a base end and a rod end, and wherein the accumulator is selectively connectable to one of the ends, and further including a second accumulator selectively connectable to the end opposite said one of the ends.

19. The active suspension structure as set forth in claim 15 wherein the accumulator is connected to the cylinder through a variable control valve, the variable control valve movable over a range of restricted flow positions to thereby provide variable cushion support.

20. In an agricultural implement having a frame adapted for towing by a vehicle, tools connected to the frame, a lift wheel assembly supporting the implement for movement over the ground, the lift wheel assembly including an extensible and retractable hydraulic cylinder having base and rod ends, hydraulic control structure connected to a source of hydraulic fluid under pressure and to the cylinder for selectively raising and lowering the frame between transport and field working positions and for adjusting the tools relative to the ground when the frame is in the field working position, suspension structure for cushioning the implement in the transport position comprising:

accumulator structure;

control valve structure connecting the accumulator structure to the cylinder, wherein the control valve structure is movable between a blocking condition substantially preventing fluid communication between the cylinder and the accumulator structure to facilitate accurate tool adjustment with the hydraulic control structure when the frame is in the field working position, and an open condition providing fluid communication between the cylinder and the accumulator to facilitate cushioned implement support when the implement is in the transport position; and means responsive to the raising and lowering of the frame for moving the control valve structure between the blocking and open positions to provide cushioned support of the implement during transport and rigid support of the implement during field working operations.

21. The suspension structure as set forth in claim 20 wherein the means responsive to the raising and lowering of the frame comprises a transducer responsive to the extension and retraction of the cylinder.

22. The suspension structure as set forth in claim 20 wherein the accumulator structure comprises a first accumulator selectively connectable to the base end of the cylinder and a second accumulator selectively connectable to the rod end of the cylinder.

23. The suspension structure as set forth in claim 20 wherein control valve structure comprises an adjustable flow valve and wherein the control valve structure is adjustable in the open position to provide adjustable cushioning.

24. The suspension structure as set forth in claim 20 further comprising a transducer connected to the implement and providing a signal in response to movement of the implement in generally a vertical direction relative to the ground, and an implement control unit connected to the control valve structure and controlling the control valve structure in accordance with the signal to thereby adjust the cushioning in response to the implement movement.

25. The suspension structure as set forth in claim 24 wherein the implement control unit is also connected to the hydraulic control structure and controls the extension and retraction of the cylinder in response to the signal to help reduce unwanted oscillations of the implement.

* * * * *